Oct. 11, 1955  A. LIPPMAN, JR  2,720,009
GLASS SEAL
Filed Dec. 27, 1952

*INVENTOR.*
ALFRED LIPPMAN JR.
BY Toulmin & Toulmin
ATTORNEYS

United States Patent Office 2,720,009
Patented Oct. 11, 1955

2,720,009
GLASS SEAL

Alfred Lippman, Jr., Dayton, Ohio, assignor to The Commonwealth Engineering Company of Ohio, Dayton, Ohio, a corporation of Ohio Application December 27, 1952, Serial No. 328,208

15 Claims. (Cl. 20—56.5)

This invention relates to seals and more particularly to seal structures for glass and to methods of producing the same.

The air-tight sealing of glass bodies is a problem in many industries. For example in the production of multi-pane windows for use in refrigerators, showcases, buildings, and the like, it is necessary to provide between the panes of glass a dead air space and this air space must be sufficiently sealed off from the atmosphere to insure that no moisture will enter the unit, as even the moisture of atmospheric air affects the glass detrimentally over a period of time.

It has been customary in the production of such multi-pane windows to secure a pair of spaced glass plates by a metal frame in which an organic sealing compound is incorporated for inhibiting the passage of moisture from the atmosphere to the dead air space. In such structures it is necessary to incorporate a silica gel or some other moisture absorbent to insure of long life of the assembly.

It has been proposed also to produce an all glass multi-pane construction by heating a pair of spaced flat plates to a temperature sufficient to render the glass electrically conductive (generally 950-1000° F.) and to then fuse hot semi-circular sections to the ends of the glass panes to form the air space.

Although the operations already set forth may be successfully performed, a problem arises in that the air trapped within the window cools to create a vacuum which causes the large glass plates to buckle inwardly. To offset this it is necessary to drill a small hole in one of the glass plates and to permit the ingress of dry air during the cooling in order to maintain atmospheric pressure within the unit. This hole, it may also be noted, is utilized for the blowing of air into the unit in order to round out the glass section while it is hot and accordingly in such constructions the hole is considered a necessity. Such a hole is generally in the form of a cone having a 3/16 inch diameter at the outside portion and a 1/8 inch diameter on the inside portion.

It is a principal object of this invention to provide a commercial process for the sealing of such holes as that described hereinbefore.

It is an important object of this invention to describe a novel seal structure of high strength which is air and moisture impermeable.

These and other allied objectives of the invention will become apparent from the following detailed description and the accompanying drawing wherein.

Figure 1:
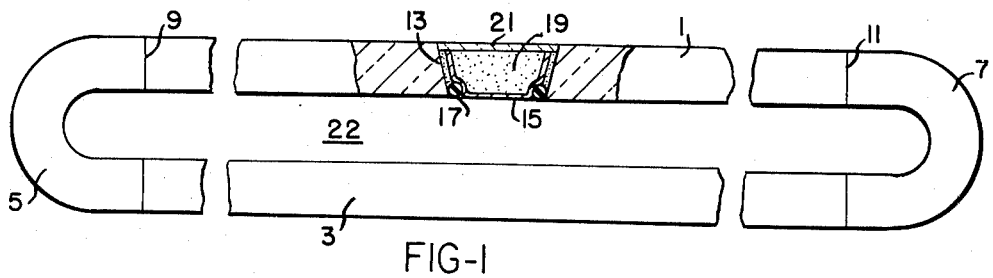
Figure 1 is an elevational view partly in section of an all glass multi-pane window.

Referring to Figure 1 there is shown a pair of spaced glass plates designated 1 and 3, respectively, to which U-shaped glass end members 5, 7 are sealed as at 9 and 11. A port is shown formed in the glass plate 1 and is defined by a conical wall 13 in which there is positioned a cup shaped insert 15. The insert 15 is provided over a lower peripheral portion thereof with a compressible silicone rubber gasket 17 which compressibly engages the wall 13. Securing these components of the seal structure together in intimately adhered relation and air impermeable fashion is a body 19 of a fusible inorganic salt superposed by a film 21 of a low melting glaze.

The inorganic salt may be any readily fusible material having a lower melting point than that of the glass body 1 and a higher melting point than that which occurs at normal atmospheric temperatures, which in the present case may be taken in the range of from minus 40° F. to 130° F. While many salts will fill these requirements it is preferable to use those salts having a melting point of less than 700° F. and greater than about 150° F., for example, potassium or sodium nitrates are suitable or the mixtures of these compounds are useful; a mixture of 54 percent potassium nitrate and 46 percent sodium nitrate which melts at about 430° F. is eminently suitable for the practice of the invention.

The glaze 21 is preferably a low melting point borosilicate glass, such as those of potassium and sodium, although any low melting point glaze or enamel may be employed. The potassium and sodium borosilicates have the advantage that they blend in readily with the glass body 1 and will be substantially imperceptible to the eye in the structure of invention.

In forming the seal set out in Figure 1 the metallic insert 15 together with the gasket 17 may first be compressibly placed within the port defined by the wall 13; thereafter the salt in fused condition is simply poured over the insert 15, gasket 17 and the wall 13. It is to be noted in this connection that the metal insert 15 should have a degree of flexibility such that when the gasket is compressed against the wall 13 a spacing will be defined between the insert and wall as illustrated.

The fused salt flows rather readily and should be allowed to substantially fill the port. As the salt begins to set, but while it is still heated, the glaze 21 in a molten condition, is applied in a thin film and allowed to set. As the temperature of the glaze will be somewhat higher than that of the salt the upper surface of the setting salt will be re-fused and will blend with the applied glaze, assuring a firm adherence between these two components. The glaze will also adhere readily to the upper wall of the glass plate 1 which itself, to avoid strains, may be brought to a temperature of about 200° F. to 300° F. in the area immediately adjacent the port.

The seal shown in Figure 1, despite the fact that the salt 19 may be water soluble, completely prevents the entry of moisture to the dead air space 22 since the glaze 21 coats over the salt and the adjacent surface of the glass plate 1. The seal also has a degree of flexibility and will be substantially unaffected by variations in temperature which might normally be expected in use, that is from minus 40° F. to 150° F.

Figure 2:
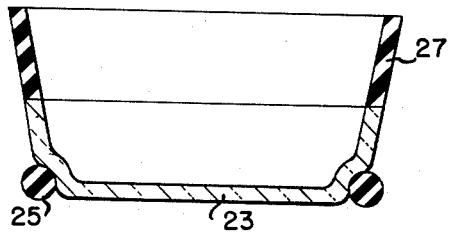
Figure 2 is a sectional view of a novel insert useful in the practice of the invention.

Referring now to Figure 2, there is shown a structure of an insert which is particularly suitable for the practice of invention. The bottom wall 23 of the insert is shown as of glass but may be of metal or any other suitable rigid body material. This base portion is recessed to receive a gasket 25 which may be of silicone or of rubber and would serve the same function as the gasket 17 illustrated in Figure 1.

Figure 3:
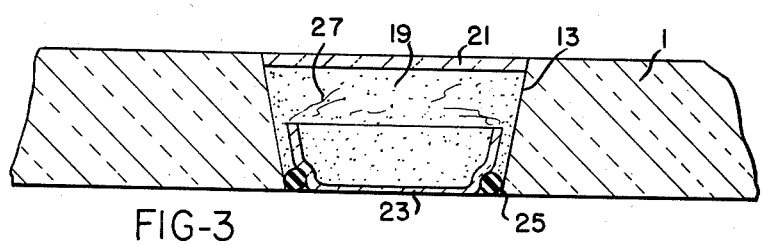
Figure 3 illustrates a seal structure having the insert of Figure 2 therein.

Secured to the upper portion of the wall 23 is a material 27, which is preferably heat deformable, as for example polyethylene. Such a structure finds particular utility in the seal illustrated in Figure 3 wherein the upper wall portion 27 is indicated as deformed throughout the body of the fusible salt 19, the salt being surmounted as in Figure 1 by a layer of moisture impermeable material or glaze 21.

In the formation of this seal the insert of Figure 2 is placed within the port as was described in connection with Figure 1 and upon the pouring of the fused salt over the insert the upper walls in response to the action of the heat tend to flow and spread through the salt body resulting in an extremely strong seal. Thus if polyethylene is used in connection with a mixture containing 54 percent potassium nitrate and 46 percent sodium nitrate (melting point 430° F.) polyethylene of an average molecular weight of about 6000 (melting point 250° F.) will become quite fluid and will set in an integral fashion with the solidifying salt.

Figure 4:
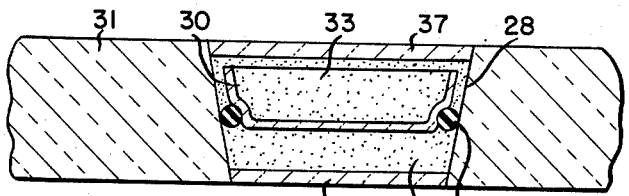
Figure 4 illustrates another embodiment of the seal structure of invention.

Figure 4 illustrates a seal which is useful in connection with a flat glass plate exposed to the atmosphere on both sides in contrast to the structure shown in Figure 1. Thus the plate 31 is provided with an insert 30 positioned wholly within the body of the port defined by the wall 28. A rubber or silicone insert 29 compressibly engages the port wall to position the insert; salt bodies 33, 35 are filmed over by glazed layers 37, 39, respectively, the seal structure being effected in the same manner as described hereinbefore.

While the seal structure thus described have been shown particularly in connection with tapered holes in order to clearly set forth the solution of the problem with regard to multi-pane windows wherein such tapered ports are normally employed, it is to be understood that the invention is not limited thereto, for it will be clear to one skilled in the art that if desired a plate as at 1 in Figure 1 could be provided with a cylindrical port, the wall of which would be recessed to receive the sealing gasket.

The invention as described has thus provided an air and moisture impermeable seal which may be formed substantially integral with a glass body and which, due to the nature of the materials employed, will be substantially imperceptible to the eye.

This application is related to co-pending applications of Alfred Lippman, Jr., Serial No. 328,207, filed December 27, 1952, and Serial No. 329,423, filed January 2, 1953, assigned to the same assignee as the present invention.

It will be understood that this invention is susceptible to modification in order to adopt it to different usages and conditions and accordingly, it is desired to comprehend such modifications within this invention as may fall within the scope of the appended claims.

I claim:

1. In a moisture proof sealing structure for a port of a glass object, a wall portion of the object defining the port, a fused inorganic salt body having a lower melting point than the glass of the object adhered to the glass wall defining the port, a film of a moisture impermeable glaze covering the otherwise exposed surface of said salt, and an insert in the salt body extending crosswise of the port.

2. In a moisture proof sealing structure for a port of a glass object, a wall portion of the object defining the port, a fused inorganic salt body having a lower melting point than the glass of the object adhered to the glass wall defining the port, a film of a moisture impermeable glaze having a lower melting point than said salt covering the otherwise exposed surface of said salt, and an insert in the salt body extending crosswise of the port.

3. In a moisture proof sealing structure for a port of a glass object, a wall portion of the object defining the port, an insert including a resilient member positioned in said port capable of closing the same, a fused inorganic salt body adhered to the glass wall defining said port and over said insert, and a film of a moisture proof glaze covering the otherwise exposed surface of said salt.

4. In a moisture proof sealing structure for a port of a glass object, a wall defining said port, an insert capable of closing said port positioned therein and terminating below the upper portion thereof, a fused inorganic salt body adhered to the glass wall defining the port and over the insert, and a film of a moisture proof glaze covering the otherwise exposed surface of said salt.

5. In a moisture proof sealing structure for a port of a glass object, an inorganic water soluble, heat fusible salt body adhered to the glass wall defining the port, a film of a moisture impermeable glaze covering the otherwise exposed surface of said salt, and an insert in the salt body extending crosswise of the port.

6. In a moisture proof sealing structure for a port of a glass object, an inorganic salt body infusible below naturally occurring temperatures and fusible below the melting point of glass adhered to the glass defining the port, and a film of a moisture impermeable glaze covering the otherwise exposed surface of said salt, and an insert in the salt body extending crosswise of the port.

7. In a moisture proof sealing structure for a port of a glass object, a wall portion of the object defining the port, a body of an inorganic salt body adhered to the glass wall defining the port, a body of a heat deformable material interlaced through said body of said salt, a film of a moisture impermeable glaze covering the otherwise exposed portion of said salt, and an insert in the salt body extending crosswise of the port.

8. In a sealing structure for a port of a glass plate, a wall portion of the object defining the port, a body of an inorganic salt having a melting point between about 150° and 700° F. adhered to the glass wall defining the port, a film of a moisture impermeable glaze covering the otherwise exposed surface of said body, and an insert in the salt body extending crosswise of the port.

9. A sealing structure for a port of a glass plate comprising a wall of the plate defining the port, an insert within said port, a gasket surrounding an outer peripheral portion of said insert and compressively engaging said wall, a body of an inorganic salt having a lower melting point than the glass of the object enclosing said insert and gasket within said port, and films of a moisture impermeable glaze covering the otherwise exposed opposite surfaces of said body of inorganic salt.

10. A moisture proof sealing structure for a port of a glass object comprising a wall portion of said object defining the port, an insert positioned in said port, said insert having a lower heat resistant rigid portion including a resilient member surrounding a portion of the outer periphery thereof, and also having an upper portion of a heat deformable material, an inorganic salt body having a lower melting point than the glass of the object adhered to the glass over said insert, and a film of a moisture proof material covering the otherwise exposed surface of said salt.

11. A moisture proof sealing structure for a port of a glass object comprising a wall portion of said object defining the port, an insert positioned in said port, said insert having a lower heat resistant rigid portion including a resilient member surrounding a portion of the outer periphery thereof, and also having an upper portion of a heat deformable material, an inorganic salt body having a lower melting point than the glass of the object adhered to the glass over said insert, and a film of a low melting glass covering the otherwise exposed surface of said salt.

12. In a seal for a port of a glass object the structure comprising, a wall defining said port, an insert in said port, a gasket positioned between said insert and said wall around a peripheral portion of said insert, and a deposit of a solidified material constituted of an inorganic salt having a high adherence to glass and a melting point less than that of the glass of said object over said gasket in air-impermeable sealed relation with said wall and said insert.

13. In a seal for a port of a glass object the structure comprising a wall defining said port, an insert in said port, a gasket compressed between said insert and said wall around a peripheral portion of said insert, and a deposit of a solidified material constituted of an inorganic salt having a high adherence to glass and a melting point less than that of the glass of said object, contacting said gasket, insert and wall to seal the whole in air-impermeable relation.

14. In a moisture proof sealing structure for a port of a glass object, a wall portion of the object defining the port, an alkali nitrate adhered to the glass wall defining the port, a film of a moisture impermeable glaze covering the otherwise exposed surface of said alkali nitrate, and an insert in the alkali nitrate extending crosswise of the port.

15. In a moisture proof sealing structure for a port of a glass object, a wall portion of the object defining the port, a mixture of alkali nitrates adhered to the glass wall defining the port, a film of a moisture impermeable glaze covering the otherwise exposed surface of said mixture of alkali nitrates, and an insert in the mixture of alkali nitrates extending crosswise of the port.

References Cited in the file of this patent

UNITED STATES PATENTS

| | | |
|---|---|---|
| 1,793,039 | Yetter | Feb. 17, 1931 |
| 2,125,372 | Fox | Aug. 2, 1938 |
| 2,372,285 | Marc et al. | Mar. 27, 1945 |
| 2,389,360 | Guyer et al. | Nov. 20, 1945 |
| 2,621,397 | Black | Dec. 16, 1952 |